ent Office 3,426,873
Patented Feb. 11, 1969

3,426,873
HYDRAULIC OVERLOAD RELEASE AND CONTROL FOR A PRESS MACHINE
Yoshitomo Tezuka, Kanagawa-ken, Japan, assignor to Aida Iron Works & Co., Ltd., Kanagawa-ken, Japan
Continuation-in-part of application Ser. No. 567,141, July 22, 1966. This application Oct. 16, 1967, Ser. No. 675,501
Claims priority, application Japan, Aug. 26, 1965, 40/51,667
U.S. Cl. 192—150                        2 Claims
Int. Cl. F16d 43/20, 71/00, 43/28

ABSTRACT OF THE DISCLOSURE

A safety device for a press machine which has a slidable member adapted to be driven by a coupling rod to apply pressure to a workpiece. A movable pressure receiving member slidable within an oil chamber by the coupling rod divides the chamber into an upper oil chamber portion and a lower oil chamber portion. It has a sealing surface facing toward said upper oil chamber portion which cooperates with an annular seal member having a sealing surface facing toward said lower oil chamber portion to form a seal. Oil pressure sensing means is coupled to said lower oil chamber portion and is adapted to be coupled to the press machine drive means driving the coupling rod for stopping the driving of the coupling rod. A relief valve is provided in the oil supply line supplying oil under pressure to the lower chamber portion. A control device is provided in the bottom wall of said slidable member defining the bottom of said lower oil chamber for returning the safety device to an operative condition after the seal is broken.

---

A control device provided in the bottom wall of said lower oil chamber section for returning said safety device after said abutment member is separated from said seal member, said control device comprising a valve oil chamber, a vertically movable valve, disposed in said valve oil chamber, wherein after said abutment member is separated from said seal member, and when a predetermined oil pressure is introduced in said valve oil chamber, the valve is first urged upwardly so that said abutment member is moved upwardly until said abutment member reaches in sealing relationship with said seal member, thereby permitting the oil pressure to be introduced into said lower oil chamber section to be ready for the next operation of the safety device.

Cross-references to related applications

This application is a continuation-in-part of U.S. Ser. No. 567,141 filed on July 22, 1966.
The invention of said Ser. No. 567,141 is directed to an improved safety device in a press machine and an improved control device for the safety device.

Background of the invention

The present invention relates to an improved safety device in a press machine and an improved control device for the safety device, and more particularly to a safety device adapted to automatically actuate the stop device of a press machine as soon as any overload condition develops in the machine, especially in the slidable member hereinafter called the slide of the machine, so as to safeguard the slide from damage which may otherwise be inflicted on a machine component, and a control device for such a safety device adapted to return the safety device to its original operative position upon completion of a cycle of operation of the safety valve.

Summary of the invention

One object of the present invention is to provide a safety device in a press machine which is adapted to displace the slide of the press machine regardless of the movement of the coupling rod or pitman rod of the machine when a work piece or press molds are subjected to a load over a predetermined value during the pressing operation with the press machine whereby the press machine, work piece or moulds may be protected against any damage which may otherwise be inflicted thereon, in which device a novel and useful relief valve is provided which enables by the adjustment thereof the regulation of the operating pressure at which the safety device is operated when an overload condition occurs in the press machine during the operation thereof.

A further object of the present invention is to provide a control device of the type as described above in which a novel and useful relief valve is provided which enables the safety device to be returned positively and quickly to its original operative position after the safety device is actuated.

The above and other objects and attendant advantages of the present invention will be more readily apparent to those skilled in the art from the following description when read in connection with the accompanying drawings.

Description of the preferred embodiments

Figure 1:
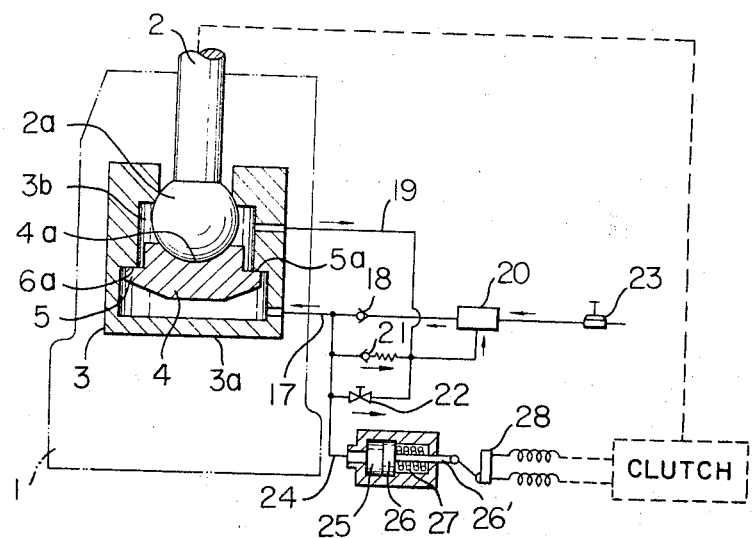
FIG. 1 is a schematic diagram explaining the principle of the present invention and showing portions thereof in section.
Figure 2:
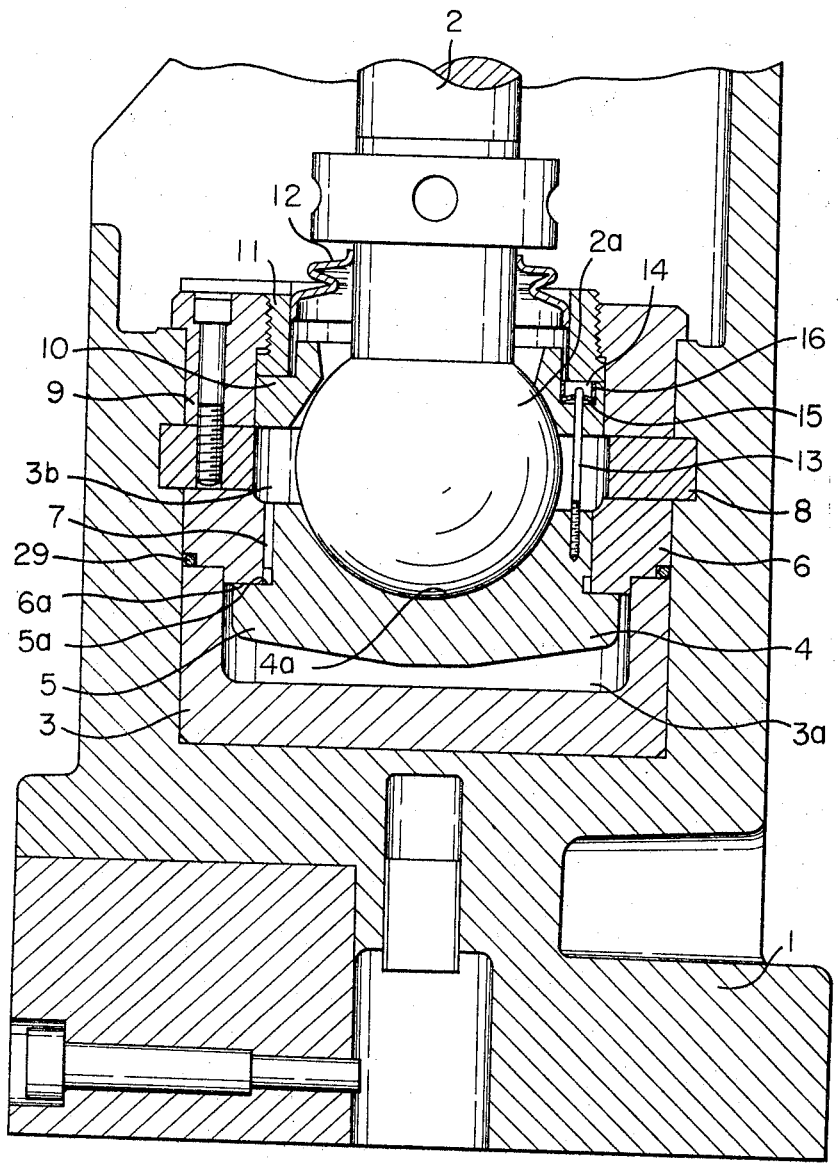
FIG. 2 is a fragmentary vertical sectional view of a preferred form of safety device embodying the present invention.

Referring now to FIGS. 1 and 2, numeral 1 designates the slide of a press machine (not shown) and the slide is adapted to be driven by a coupling rod 2 having a spherical ball 2a at its lower end which is operatively connected to the driving crank shaft (not shown) of the press machine to be driven thereby. An oil case 3 is rigidly positioned in a cavity in the slide 1 and the cavity of the oil case is divided into a lower oil chamber section 3a of larger cross sectional area and an upper oil chamber section 3b of smaller cross sectional area by means to be explained hereinafter.

An abutment or pressure receiving member 4 is housed within the oil case 3 for upward and downward movement therein. The abutment member 4 has an enlarged flanged portion 5 at its lower end which is positioned within the lower oil chamber portion 3a and a rounded concave recess 4a in the center of the upper surface thereof for receiving or abutting against the spherical ball 2a of the coupling rod 2 so as to receive pressure therefrom. The concave recess 4a in the upper surface of the abutment member 4 has a curvature which substantially corresponds to the curvature of the spherical ball 2a. An annular seal ring 6 is seated on the upper peripheral edge of the lower oil chamber section 3a with its inner periphery projecting inwardly of the oil case 3 and contacting the opposed outer periphery of the non-flanged upper portion of the abutment member 4 so as to divide the interior of the oil case 3 into the upper and lower chamber sections 3b and 3a in cooperation with the opposed outer periphery of the abutment member 4. The under surface 6a of the seal member 6 is adapted to contact the upper surface 5a of the flanged portion 5 of the abutment member 4. The outer periphery of the upper portion of the abutment member 4 is provided with a plurality of vertical grooves 7 (only one of them is shown in FIG. 2) and these grooves communicate with the upper oil chamber section 3b of the oil case 3. A split ring 8 is positioned in a peripheral notch formed in the inner surface of the slide 1 and is seated on the top of seal ring 6. Split ring 8 is held in position by means of bolts (only one of them is shown) which extend through the split ring and an annular ring retainer 9 positioned on the top of split ring 8 within the oil case 3. A ball stopper 10 is provided with its outer periphery in contact with the inner periphery of the ring retainer 9 for limiting the movement of the spherical ball 2a of the coupling rod 2. The ball stopper 10 is held in position by an annular holding member 11 which is in turn held in position by its threaded outer periphery in engagement with the opposed threaded inner periphery of ring retainer 9. A dust diaphragm 12 is provided with the upper end secured to coupling rod 2 and the lower end secured to annular holding member 11 by any suitable means, said dust diaphragm 12 being provided to prevent dust from invading the interior of the oil case 3. A plurality of threaded bars 13 (only one of them is shown in FIG. 2) are threaded into abutment member 4 spaced at equal intervals around abutment member 4 and these bars extend vertically of the abutment member 4. Each of the upper ends of vertically extending bars 13 extends loosely through the respective bores in the ball stopper 10 into space 14 defined by the upper surface of ball stopper 10 and the under surface of annular holding member 11. An annular leaf spring 15 is disposed in each of above-mentioned spaces 14 and spring 15 is held in position therein by means of retaining ring 16. The upper ends of above-mentioned bars 13 are tightly mounted in corresponding bores in leaf spring 15. Thus, the abutment member 4 is normally held in suspension within the oil case 3 as shown in FIGS. 1 and 2 in a position in which the upper surface 5a of flanged portion 5 of abutment member 4 contacts under surface 6a of seal ring 6. An O-ring 29 is disposed in a peripheral notch formed at the lower end of seal member 6.

Lower oil chamber section 3a of oil case 3 has an opening formed in one side wall thereof to which is connected a pressure line 17. A check valve 18 is provided in line 17 on the discharge side of pressure oil pump 20 and the upper oil chamber portion 3b has an opening formed in one side wall to which is connected a discharge line 19 connected to the suction side of the pump 20. A safety valve 21 is disposed a first branch line extending in parallel to pressure line 17 and a stop valve 22 is disposed in a second branch line extending parallel to pressure line 17 and the first branch line. A pressure regulator 23 is disposed in a line extending from oil pressure pump 20 to an associated means in the system (not shown) to regulate the pump 20. Lower oil chamber portion 3a also communicates through a line 24 which branches from an intermediate point of the pressure line 17 with an oil pressure-operated cylinder 25 in which a piston 26 is provided for reciprocal movement therein. Rod 26' of piston 26 is surrounded by a coil spring 27 and the piston rod is operatively connected to a microswitch 28 which is, in the illustrated embodiment, electrically connected to the circuit of an electromagnetic control or stop device (not shown) for the clutch of the crank shaft (not shown).

A constant oil pressure is applied to lower oil chamber section 3a of oil case 3 by oil pressure pump 20. Upper oil chamber section 3b of oil case 3 is also filled with pressurized oil. Therefore, when the coupling rod 2 is driven for downward movement during the operation by the press machine with which the novel safety device is employed, the downward movement of the coupling rod 2 is transferred through lower end spherical ball 2a, abutment member 4, oil within lower chamber section 3a, oil case 3 to slide 1 whereupon the slide performs a desired pressing operation on a work piece (not shown).

During the pressing operation, the oil pressure within the lower oil chamber section 3a is maintained at a value sufficient to permit slide 1 to perform a desired pressing operation with a predetermined load and in this case upper surface 5a of lower end flanged portion 5 of abutment member 4 is maintained in contact with under surface 6a of seal ring 6 under sufficient pressure to prevent the oil within lower oil chamber section 3a from leaking into upper oil chamber section 3b and, at the same time, permitting slide 1 to be moved downwardly, the pressure of the oil within lower oil chamber section 3a being sufficient to prevent downward movement of abutment member 4.

If an overload condition takes place during the pressing operation, slide 1 is subjected to a force in excess of a predetermined value, and therefore, the oil within lower oil chamber section 3a is slightly compressed (changes in volume) and upper surface 5a of flanged portion 5 of abutment member 4 moves out of contact with the under surface 6a of seal ring 6 to leave a clearance therebetween so that the pressurized oil within lower oil chamber section 3a can rush through the clearance and vertical grooves 7 in abutment member 4 into the upper oil chamber section 3b of oil case 3. Whereupon the pressure within lower oil chamber section 3a drops suddenly, and accordingly, the oil pressure within cylinder 25 also drops whereby piston 26 is urged toward the left (as seen in FIG. 1) within cylinder 25 by the action of coil spring 27 so as to actuate the microswitch 28. Thus, the clutch for driving the press machine is disengaged thereby preventing the overload from being transferred from the slide to coupling rod 2 and other related parts.

Then, as the crank shaft is rotated upon engagement of the clutch, coupling rod 2 is caused to move upwardly and, at the same time, abutment member 4 is also caused to be moved upwardly by virtue of the oil pressure in lower oil chamber section 3a. In this case, the oil within upper oil chamber section 3b flows back through grooves 7 in abutment member 4 and the clearance between the under surface 6a of seal ring 6 and upper surface 5a of flanged portion 5 of abutment member 4 into lower oil chamber section 3a, and then surfaces 5a and 6a come to contact with each other again to seal the clearance therebetween and the oil pressure is pumped from oil pressure pump 20 to lower oil chamber section 3a whereby the pressure within lower oil chamber section 3a will be maintained at the predetermined pressure value suitable to perform a predetermined pressing operation by slide 1.

The valve 18 is provided to prevent oil from flowing back toward the pump 20 from the lower oil section chamber 3a, oil valve 21 is provided to relieve excess pressure generated by the pump 20. Valve 22 is provided to enable the oil pressure in lines 17 to be manually released to line 19.

Figure 3:
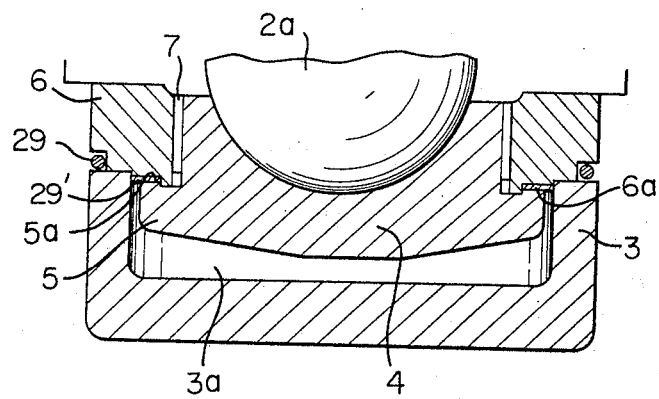
FIGS. 3 through 7 are fragmentary vertical sectional views of various alternative forms of safety devices embodying the present invention.
Figure 4:
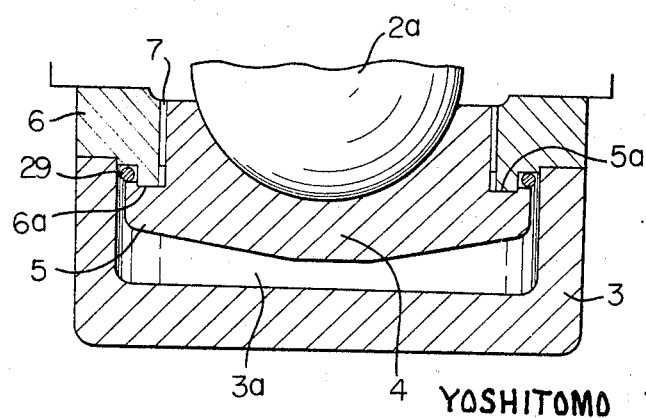
Figure 5:
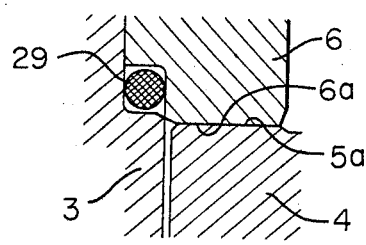
Figure 6:
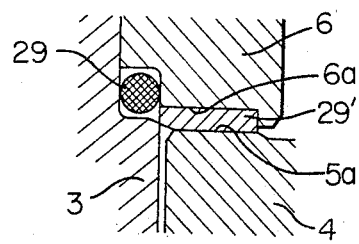
Figure 7:
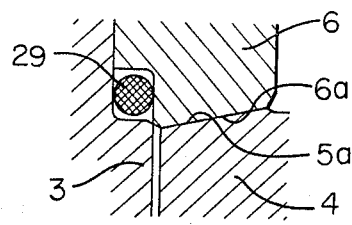

FIG. 3 shows an alternative embodiment of the safety device according to the present invention and this embodiment is substantially the same as the foregoing embodiment except that under surface 6a of annular seal ring 6 has a sealing piece 29' embedded therein and the sealing piece may be formed of metal such as copper or aluminum, or non-metallic material such as synthetic resin. FIG. 4 shows a further alternative embodiment of the safety device according to the present invention which is substantially the same as the foregoing two embodiments except that O-ring 29 is provided in a notch formed in the under surface 6a of seal member 6 in the outer periphery thereof. FIG. 5 shows a further alternative embodiment of the safety device which is substantially the same as the embodiment shown in FIG. 4 except that the corners of mating surfaces 5a and 6a of abutment member 4 and seal member 6 are bevelled. FIG. 6 shows a further alternative embodiment of the safety device which is substantially the same as the embodiment of FIG. 5 except that in addition to O-ring 29 shown in FIG. 5, a sealing ring 29' identical with that shown in FIG. 3 is embedded in the under surface 6a of seal member 6. FIG. 7 shows a further alternative embodiment of the safety device which is substantially the same as that shown in FIG. 5 except that mating surfaces 5a and 6a of abutment member 4 and sealing members 6 are complementarily slanted.

Figure 8:
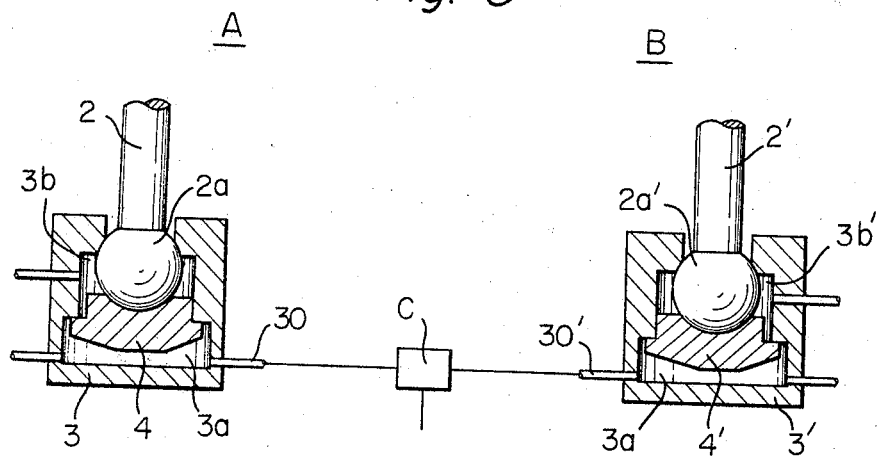
FIG. 8 is a fragmentary vertical sectional view showing an instance in which two identical safety devices embodying the present invention are employed in a two-point press machine.

FIG. 8 shows an embodiment in which two identical safety devices which may be any of the foregoing embodiments are employed in a conventional two-point type press machine. In this embodiment in order to prevent slide 1 of the two-point press machine (not shown) from tilting due to imbalance which may develop when different magnitudes of loads are applied at the two operation areas in the two-point press machine, a balancer C is provided between two operation areas A and B of the machine and the balancer communicates at one end through a conduit 30 with lower oil chamber section 3a of oil case 3 of one safety device which is associated with coupling rod 2 at the A area and communicates at the other end through a conduit 30' with lower chamber section 3a' of oil case 3' of the other safety device which is associated with coupling rod 2' at the B area.

Figure 9:
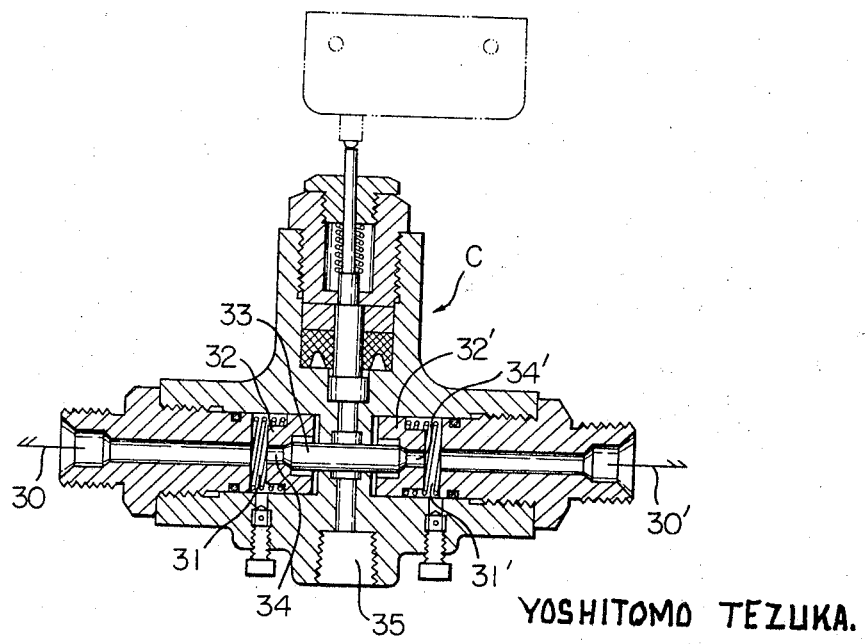
FIG. 9 is an enlarged fragmentary vertical sectional view of said balancer shown in FIG. 8.

FIG. 9 shows the detailed construction and operation of balancer C as shown in FIG. 8 on an enlarged scale. In the two-point press machine incorporating the two identical safety devices which may be any of the foregoing embodiments and balancer C as shown in FIG. 8 therein, if overload takes place at the A area, for example, the oil pressure within lower oil chamber section 3a of oil case 3 of the safety device drops suddenly resulting in a drop in the oil pressure within a cylinder 31 of balancer C which is in communication with conduit 30 which in turn communicates with lower oil chamber section 3a while the oil pressure within a similar second cylinder 31' on the side of the balancer opposite to cylinder 31 maintains a high value, and therefore, piston 32' in cylinder 31' move inwardly of its associated cylinder to push piston 32 in cylinder 31 outwardly of the associated cylinder through an intermediate needle valve 33 positioned between the two cylinders until the inward movement of piston 32' is stopped by the inner wall of associated cylinder 31'. After piston 32' has been stopped as mentioned above, needle valve 33 continues to be moved forwardly pushing piston 32 independently of piston 32' thereby uncovering axial bore 34' of cylinder 31' whereupon lower oil chamber section 3a' of oil case 3' of the safety device at the B area which communicates through line 30' to cylinder 31' will be placed in communication with a vertical oil discharge passage 35 extending across axial bores 34 and 34' of the two cylinders 31 and 31' whereby the oil pressure within lower oil chamber section 3a' drops to a value corresponding to that of the oil pressure within lower oil chamber section 3a of oil case 3 of the safety device at the A area and as a result the A and B areas are balanced and the balanced state of slide 1 can be restored so as to prevent the slide from being tilted.

Figure 10:
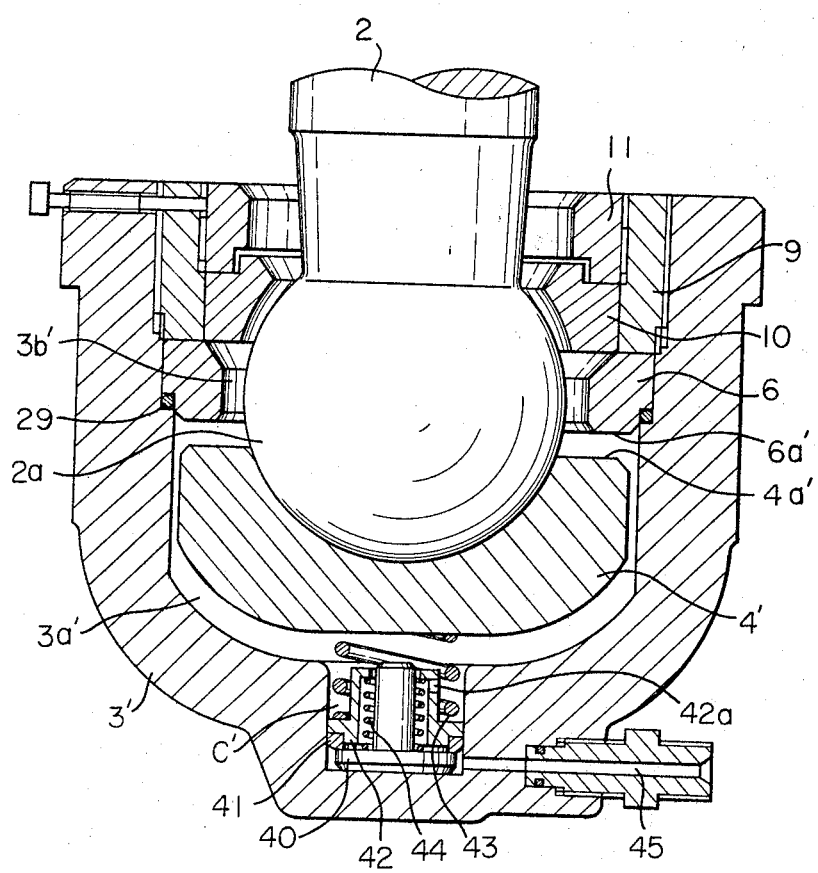
FIGS. 10 through 13 are fragmentary vertical sectional views of a further alternative form of safety device having a control device therefore incorporated therein and which show said safety device and control device in different operative conditions during a cycle of operation of a press machine with which said devices are employed.
Figure 11:
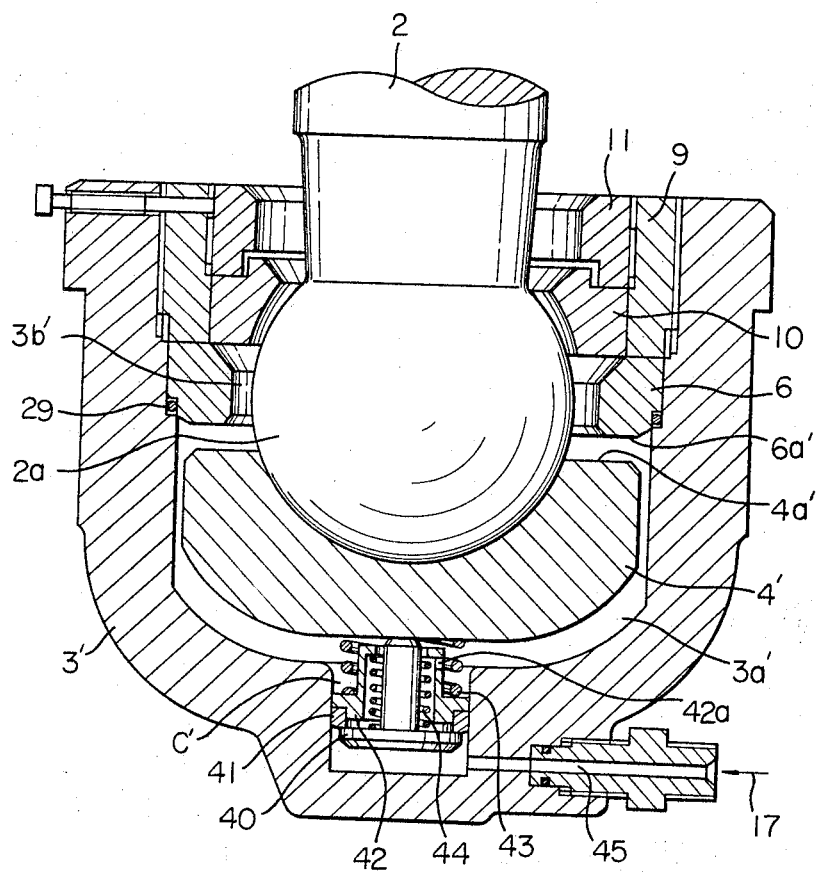
Figure 12:
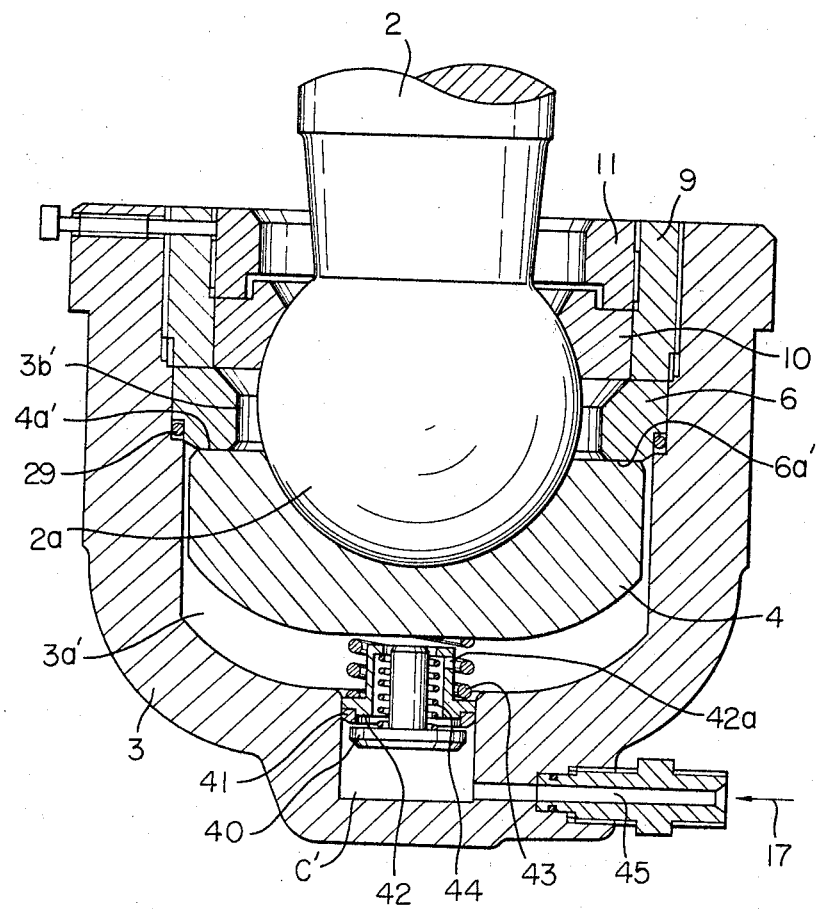
Figure 13:
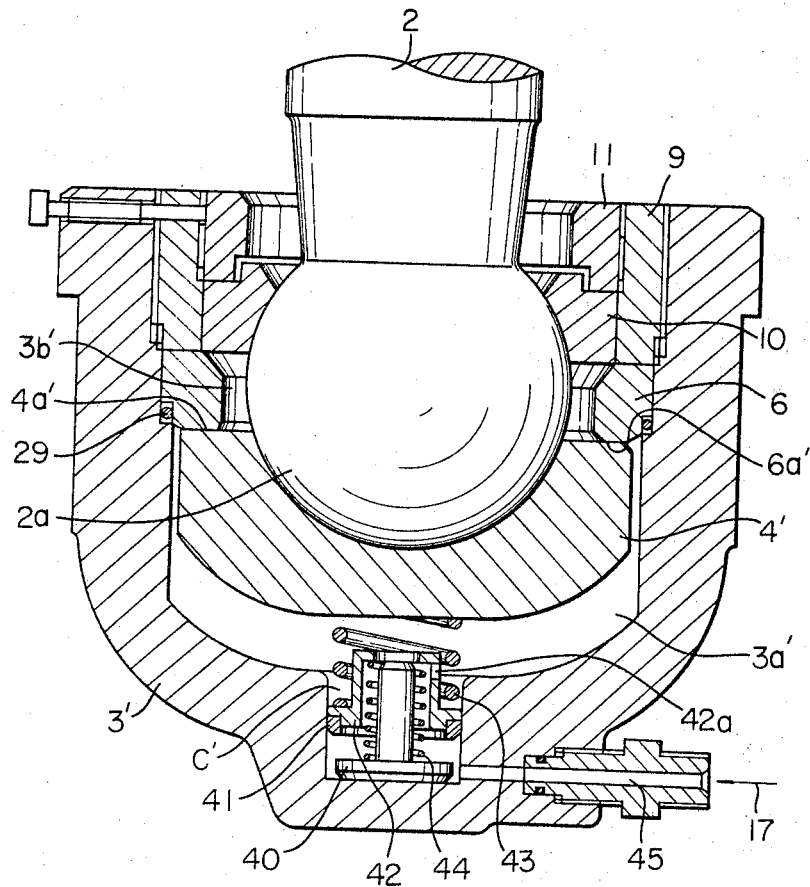

FIGS. 10 through 13 show a further alternative form of the safety device which is adapted to be employed in conjunction with a control device therefor in order to positively return the safety device to its original operative position after a cycle of operation. The safety device shown in these figures is substantially the safe as that of FIG. 2 except that the oil case is in the form of a substantially U-shaped cross sectional construction instead of a rectangular cross sectional construction as that of FIG. 2, the pressure receiving or abutment member is not provided with the flanged portion as shown in FIG. 2, and the split ring is not provided, but the seal member is directly contacted by the annular retainer and held in position thereby, and the threaded bars, dust diaphragm and leaf spring are not provided, and therefore, the other portions which are identical with those of the embodiment of FIG. 2 and are not necessary for explaining the relationship which this alternative embodiment has with respect to the novel control device are omitted from the embodiment of FIGS. 10 through 13 in order to simplify the drawings. FIG. 10 shows the parts in position when an overload condition has developed in the system. FIG. 11 shows the parts in position when the control device is about to initiate its operation for returning the safety device to its original operative condition, FIG. 12 shows the parts in position when the lower oil chamber section has entrapped a predetermined oil pressure therein, and FIG. 13 shows the parts in position when the control device has completed a cycle of operation or the safety device has been returned to its original operative condition.

Oil case 3' shown in these figures is divided into a lower oil chamber section 3a' and an upper oil chamber section 3b' by seal member 6 and cooperating abutment member 4', and, when lower oil chamber section 3a' is filled with high pressure oil, upper surface 4a' is in contanct with under surface 6a' of seal member 6 as seen in FIG. 13. In this condition, when coupling rod 2 connected to the crank shaft (not shown) is driven downwardly, the downward movement of the coupling rod is transferred through its lower end spherical ball 2a, abutment member 4' and high pressure oil within lower oil chamber section 3a' to the slide (not shown) whereupon the slide can perform a desired pressing operation on a work piece (not shown). A valve oil chamber C' is provided in the bottom wall of oil case 3' just below lower oil chamber section 3a' and the valve oil chamber C' is in communication at its upper end with the lower oil chamber section 3a' and the lower end of the valve chamber C' is in communication with the bore 45 of an oil pressure cylinder transversely extending into the bottom wall of U-shaped oil case 3'. A valve housing 42 is provided within valve oil chamber C' and a T-type valve 40 is received within valve housing 42 with the flanged transverse bottom portion there of projecting out of the housing. An annular valve retainer 41 is disposed around valve housing 42 and is adapted to seat on the flanged transverse bottom portion valve 40. A coil spring 44 is disposed around the stem of valve 40 for normally urging the valve downward and a second larger coil spring 43 is disposed around valve housing 42 within valve oil chamber C' for normally urging the valve housing downward. The valve retainer 41 is formed of flexible material such as rubber or Teflon. Thus, it will be understood that spring 43 can directly urge valve 40 downward when the flanged transverse bottom portion thereof is in contact with retainer 41 after weaker spring 44 is compressed between valve housing 42 and valve 40. Valve 40 is loosely disposed within valve housing 42 and is adapted to move vertically in unison with or independently of valve housing 42 by means of coil spring 44. A transverse oil pressure passage 42a is formed in one side wall of valve housing 42.

If any overload condition occurs in the system during the pressing operation, resistance in a magnitude in excess of a predetermined value will develop on the slide (not shown), the oil within lower oil chamber section 3a' is slightly compressed (change in volume) due to the downward movement of coupling rod 2. Whereupon oil case 3' is caused to rise up relative to abutment member 4' so as to separate under surface 6a' of seal member 6 from its contact with upper surface 4a' of abutment member 4' leaving a clearance therebetween as seen in FIG. 10. Therefore, the safety device functions in the same manner as the safety devices of the foregoing embodiments and, at the same time, abutment member 4' compresses spring 43 so as to lower valve housing 42 whereby valve retainer 41 is urged against the flanged transverse bottom portion of valve 40 against the action of weaker spring 44.

In order to raise valve 40, oil pressure is supplied from any suitable supply source (not shown) through bore 45 in the transverse cylinder against the under surface of valve 40 and as a result valve 40 and valve retainer 41 move upwardly in unison while maintaining their contact thereby compressing spring 43 until the upper end of the stem of valve 40 comes into contact with the bottom of abutment member 4' whereupon the abutment member 4' is pushed upwardly so that the safety device can initiate its return movement (see FIG. 11).

As abutment member 4' is moving upwardly, when upper surface 4a' of abutment member 4' abuts against under surface 6a' of seal member 6, the upward movement of abutment member 4' is stopped (see FIG. 12) whereupon the oil pressure supplied through cylinder bore 45 is applied against the under surface of valve retainer 41 while valve 40 abuts against the bottom wall of abutment member 4' so as to raise the retainer and accordingly, to compress coil spring 43 so that a clearance can be formed between valve 40 and valve retainer 41 and the oil pressure acting against the under surface of valve 40 is relieved and valve 40 will be urged downwardly by the action of spring 44. In this case, the oil pressure within valve oil chamber C' flows through passage 42a formed in the side wall of valve housing 42 into lower oil chamber section 3a' and the oil pressure within the valve housing drops to a level so as to balance the oil pressure in both lower oil chamber section 3a' and valve oil chamber C' whereupon the valve housing descends a predetermined distance depending upon the free length of spring 43 and maintains its stabilized state (see FIG. 13) by virtue of valve retainer 41 thereby returning the safety device to its original operative condition.

Figure 14:
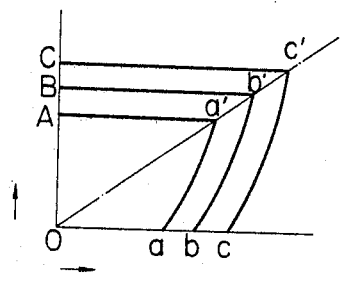
FIG. 14 is a graph showing the characteristics of the safety device shown in FIG. 1.

In the safety device illustrated in FIG. 1, the operating pressure of the safety device (the maximum pressure in the lower oil chamber section of the safety device at which pressure the safety device is operated when an overload condition occurs in the press machine) varies in proportion to the variation in the initial pressure (the oil pressure to be applied in the lower oil chamber section of the safety device at the initial setting of the safety device) as illustrated in FIG. 14. In FIG. 14, $a$, $b$ and $c$ designate the initial pressures, respectively, $a'$, $b'$ and $c'$ showing the maximum operating pressures, respectively, and A, B and C showing the values of overload conditions corresponding to said maximum operating pressures $a'$, $b'$ and $c'$, respectively. As seen in FIG. 14, the maximum operating pressure is shifted by varying the initial pressure. By utilizing these characteristics the maximum operating pressure of the safety device can be varied by merely adjusting the initial pressure. In case the maximum operating pressure is to be raised, it is easily achieved by increasing the initial pressure in the lower oil chamber section. However, in case the initial pressure is to be lowered, the oil pressure in the lower oil chamber section must be relieved. This means that the adjustment of the initial pressure always requires the adjustment of the oil pressure in the lower oil chamber section.

Figure 15:
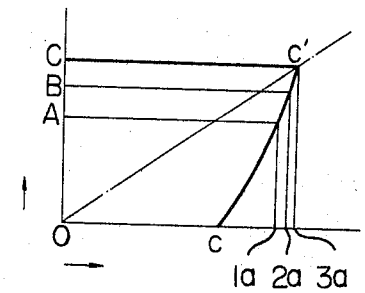
FIG. 15 is a graph showing the characteristics of an alternative form of the safety device shown in FIGS. 16–18.
Figure 16:
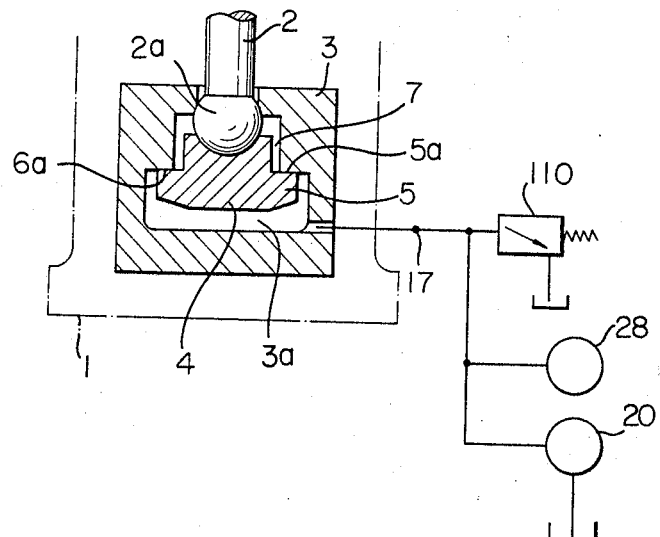
FIG. 16 is a schematic diagram explaining the principle of the alternative form of the present invention and showing portions thereof in section.
Figure 17:
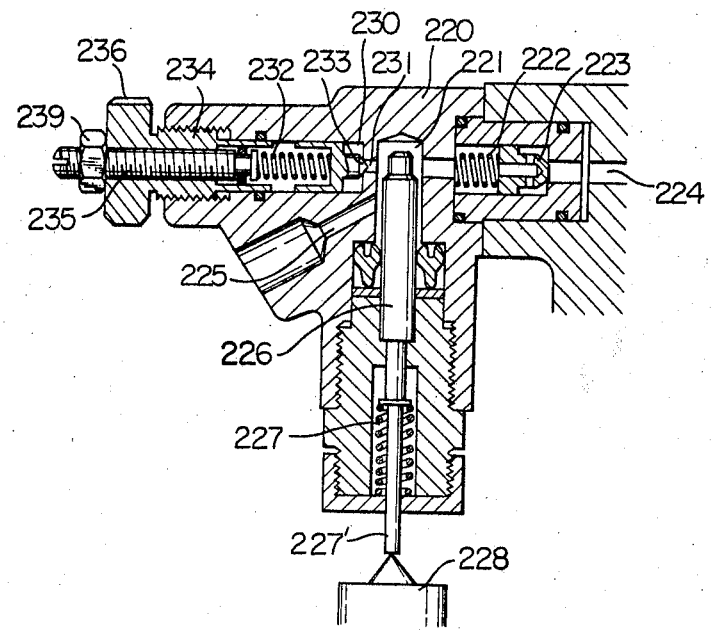
FIG. 17 is a sectional view showing the relief valve used in the alternative form of the present invention shown in FIG. 16.
Figure 18:
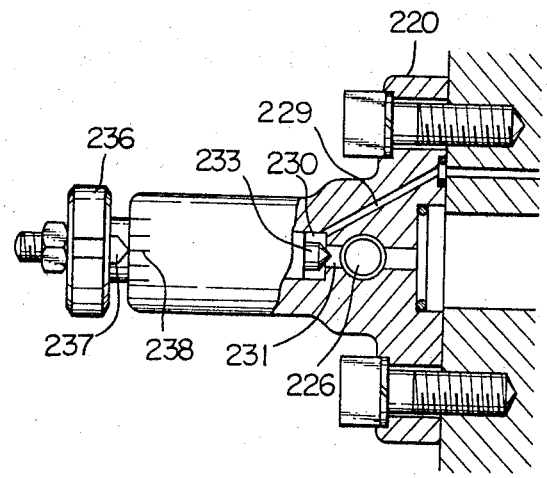
FIG. 18 is a cross sectional view showing the portion of the relief valve of FIG. 17.

FIGS. 16–18 show an alternative form of the present invention which enables the maximum operating pressure to be easily adjusted to the desired value by providing a relief valve in the line communicating with the lower oil chamber section and the oil pump. When the curve C–C' in FIG. 14 is utilized, the maximum operating pressure can be set to any of A, B or C values by merely setting the operating pressure of the relief valve to any of $1a$, $2a$ or $3a$ as shown in FIG. 15.

The arrangement shown in FIG. 16 is substantially the same as that shown in FIG. 1 except that a relief valve 110 is provided in the pressure oil line. By adjusting the relief valve, the above mentioned adjustment of the maximum operating pressure can be achieved.

FIGS. 17 and 18 show an embodiment of relief valve 110. Valve chamber 221 of valve housing 220 is in communication with the discharge line of pump 20 through passage 224 and a non-return valve 223 is provided therein against which the force of spring 222 acts. Valve chamber 221 also communicates with lower oil chamber section 3a of the safety device through passage 225. Plunger 226 is urged by spring 227 into valve chamber 221, rod 227' extending from plunger 226 being connected to microswitch 228 which is adapted to stop the operation of the press machine. Valve chamber 221 has an oil discharge opening 231 opening to oil discharge chamber 230 communicating with oil discharge passage 229 which is turn communicates with the oil tank, said oil discharge opening 231 being closed by valve 233 which is urged by means of spring 232, said spring 232 being held at its other end by receiving rod 235 which is threadedly mounted through adjusting thread 234 which is threadedly received in valve housing 220. Lock nut 239 fixedly secures receiving rod 235 in position in adjusting thread 234. Handle 236 is integral with adjusting thread 234 and is provided with pointer 237 which cooperates with pressure scale 238 provided on said valve housing 220 for indication of the relief pressure to which pressure spring 232 is adjusted by adjusting thread 234.

Since valve chamber 221 communicates with lower oil chamber section 3a of the safety device, the oil pressure in lower oil chamber section 3a can be easily adjusted by merely adjusting the force of spring 232 which urges valve 233 against discharge opening 231, the adjustment of spring 232 being effected by moving adjusting thread 234. When the force of spring 232 urging valve 233 against discharge opening 231 is reduced, valve 233 is opened and a portion of the oil within valve chamber 221 is discharged by the oil pressure in lower oil chamber section 3a through oil discharge opening 231, oil discharge chamber 230 and oil discharge passage 229 to the oil tank, thereby reducing the oil pressure in lower oil chamber section 3a, so that the same effect is obtained by the above operation as is obtained by adjusting the initial pressure to a lower value to thereby reduce the maximum operating pressure as shown in FIG. 14.

As described above, the safety device can be operated at any desired value of the maximum operating pressure such as A, B or C by merely setting the force of spring 232 by the adjustment of adjusting thread 234 to any of the desired positions corresponding to $1a$, $2a$ or $3a$ in FIG. 15, while the initial pressure set in lower oil chamber section 3a remains at a constant pressure.

Figure 19:
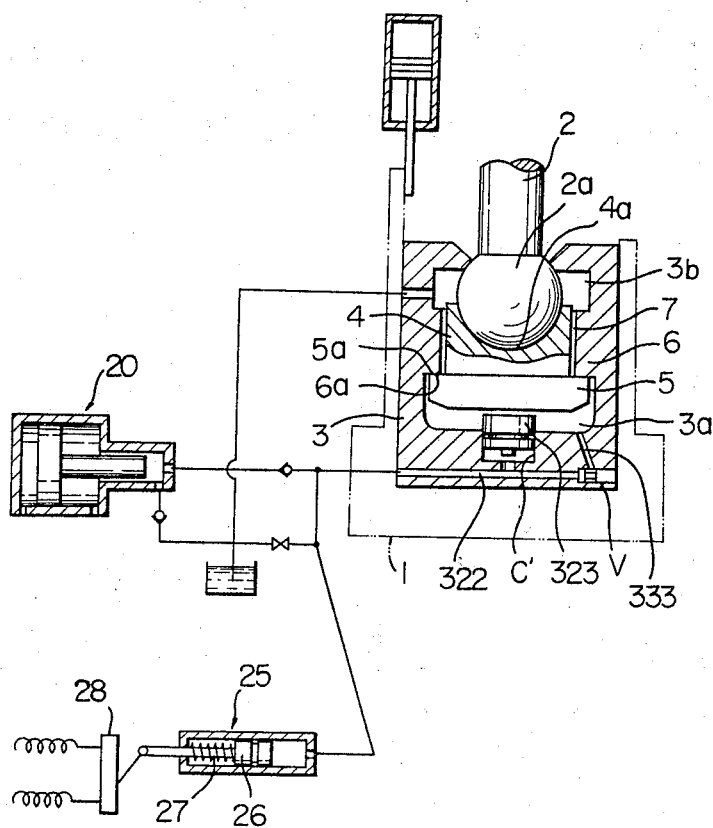
FIG. 19 is a longitudinal sectional view showing the essential parts of a further alternative form of the control device for returning the safety valve to its initial operative position according to the present invention.
Figure 20:
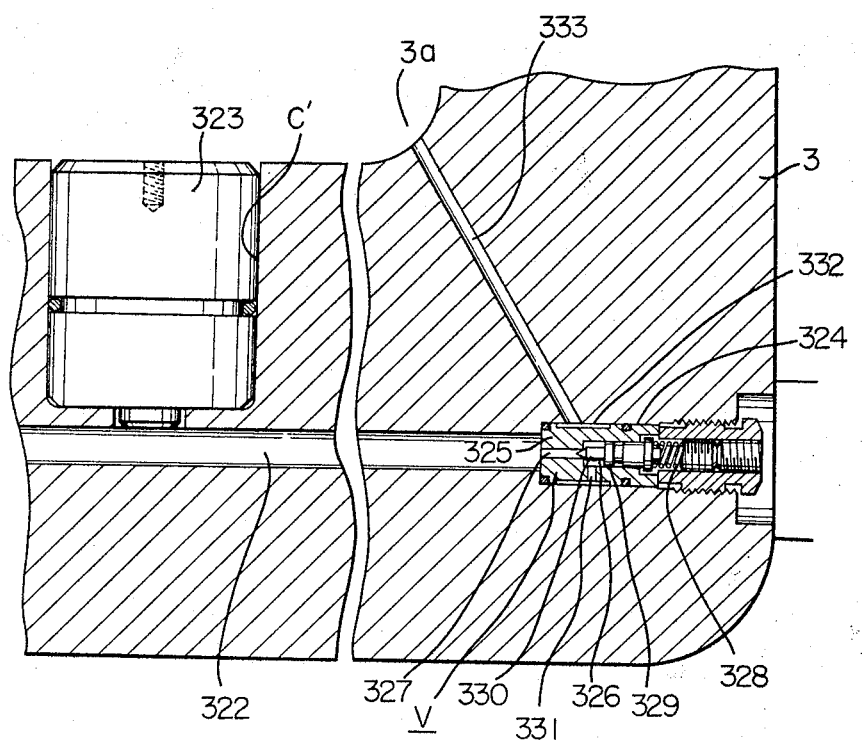
FIG. 20 is an enlarged sectional view showing the relief valve used in the embodiment shown in FIG. 19.

An alternative form of the control device for returning the safety device to its initial operative position is illustrated in FIGS. 19 and 20.

The arrangement shown in FIG. 19 is substantially the same as that shown in FIGS. 1 and 10 to 13 except that a relief valve is provided which communicates with the pressure oil passage leading to the lower oil chamber section and with the passage directly leading to the lower oil chamber section and that the valve arrangement in the valve oil chamber is simplified.

In the safety device shown in FIG. 19, when it is operated by the occurrence of an overload condition in the press machine, abutment member 4 descends onto the bottom of lower oil chamber section 3a. As shown in FIG. 20, valve oil chamber C' is provided in the bottom of lower oil chamber section 3a at the center thereof with the axis being disposed vertically. The lower end of valve oil chamber C' is in communication with oil passage 322. A piston 323 is slidably fitted in valve oil chamber C', the upper end of said piston being opposed to the lower surface of abutment member 4. Oil passage 322 communicates with valve hole 327 in relief valve v which is fitted in hole 324 provided in one side of oil case 3. Said valve hole 327 communicates with valve chamber 326 of valve housing 325 of said relief valve v. Valve body 330 which is integral with piston 329 is slidably fitted in valve chamber 326 and is urged by spring 328 to normally close said valve hole 327, said valve chamber 326 communicating with lower oil chamber section 3a through hole 331 provided in the side wall of valve housing 325, annular groove 332 provided in the outer peripheral wall of valve housing 325 and communicating with hole 331, and through passage 333.

In the operation of the device as described above, the pressurized oil from oil pump 20 is fed to lower oil chamber section 3a from oil passage 322 through passage 333 by urging valve body 330 to the open position against the action of spring 328 and the oil pressure in lower oil chamber section 3a urges abutment member 4 at a predetermined pressure against sealing portion 6 of oil case 3 with the upper surface 5a of flanged portion 5 of abutment member 4 in sealing contact with the lower surface 6a of said sealing portion 6. The normal operation is effected under the above condition.

After abutment member 4 descends onto the bottom of lower oil chamber section 3a by the actuation of the safety device by the occurrence of an overload condition in the press machine during the operation thereof, the pressurized oil is fed to oil passage 322 from oil pump 20, then the pressurized oil is forced into valve oil chamber C' from oil passage 322 thereby urging piston 323 therein upwardly so that abutment member 4 overlying piston 323 is moved upwardly. In this case, since hole 327 in relief valve v is small in comparison with oil passage 322 and the force acting on valve body 330 is low and the oil pressure in lower oil chamber section 3a and hence in passage 333 is low so that the force acting on piston 329 is low, valve body 330 moves to its closed position by the action of spring 328, therefore, the pressurized oil in passage 322 is fully utilized for urging piston 323 in valve oil chamber C' upwardly so as to raise abutment member 4 overlying piston 323 into sealing engagement with sealing portion 6 of oil case 3.

When upper surface 5a of flanged portion 5 of abutment member 4 contacts with lower surface 6a of sealing portion 6 of oil case 3, the oil pressure in passage 322 increases and valve body 330 is opened against the action of spring 328 thereby feeding pressurized oil through passage 333 into lower oil chamber section 3a. When the oil pressure in lower oil chamber section 3a is equalized with that in passage 322, piston 323 no longer has a differential oil pressure acting on the lower surface thereof and the piston descends by gravity in valve oil chamber C' whereby the oil pressure in lower oil chamber section 3a becomes adequate for operating the press machine.

As described above, by the provision of relief valve v, the pressurized oil is prevented from being fed into lower oil chamber section 3a until abutment member 4 is raised to a sealing position in lower oil chamber section 3a by the upward movement of piston 323 in valve oil chamber C' caused by the oil pressure in passage 322 so as to be ready for the next operation of the safety device. This assures the positive and rapid return movement of abutment member 4 to its initial operative position by fully utilizing the oil pressure for raising it before the pressurized oil is fed into lower oil chamber section 3a for the next operation of the safety device.

As mentioned above, in any of the foregoing embodiments, when an overload condition occurs during the pressing operation, a clearance is formed between the contact surfaces of the abutment member and the seal member by the slight compression of the pressurized oil within the lower oil chamber section, and the oil within the lower chamber section is caused to rush through the clearance into the upper oil chamber section thereby rapidly lowering the oil pressure within the lower oil chamber section whereupon the safety device is actuated as mentioned above by the rapid variation of the oil pressure, and therefore, only a very short period of time elapses after the development of any overload condition until the initiation of the operation of the safety devices whereby the parts of the press machine can be positively and safely protected against damage due to overload conditions developed in the system.

While various preferred embodiments of the invention have been shown and described in detail it will be understood that they are for the purpose of illustration only and are not to be taken as a definition of the scope of the invention, reference being had for this purpose to the appended claims.

I claim:

1. A safety device for a press machine which has a slidable member adapted to be driven by a coupling rod to apply pressure to a workpiece, said safety device comprising an oil chamber in said slidable member, a movable pressure receiving member disposed for movement within said oil chamber and adapted to receive pressure from the coupling rod for moving the pressure receiving member in the chamber, an annular seal member disposed in the periphery of said oil chamber, said pressure receiving member dividing the chamber into an upper oil chamber portion and a lower oil chamber portion, said pressure receiving member having a sealing surface facing toward said upper oil chamber portion and said annular seal member having a sealing surface facing toward said lower oil chamber portion and being opposed to said sealing surface of the pressure receiving member and abuttable thereby to form a seal between the sealing surface when the surfaces contact each other, oil pressure sensing means coupled to said lower oil chamber portion and adapted to be coupled to the press machine drive means driving the coupling rod for stopping the driving of the coupling rod, said upper oil chamber portion having an opening communicating with a space at atmospheric pressure, oil supply means for supplying oil under high pressure to said lower oil chamber portion, an oil supply line coupled between said oil supply means and said oil chamber, and a relief valve in said oil supply line and having means for adjusting the pressure at which said relief valve opens and means for discharging oil removed through said relief valve to a sump.

2. A safety device for a press machine which has a slidable member adapted to be driven by a coupling rod to apply pressure to a workpiece, said safety device comprising an oil chamber in said slidable member, a movable pressure receiving member disposed for movement within said oil chamber and adapted to receive pressure from the coupling rod for moving the pressure receiving member in the chamber, an annular seal member disposed in the periphery of said oil chamber, said pressure receiving member dividing the chamber into an upper oil chamber portion and a lower oil chamber portion, said pressure receiving member having a sealing surface facing toward said upper oil chamber portion and said annular seal member having a sealing surface facing toward said lower oil chamber portion and being opposed to said sealing surface of the pressure receiving member and abuttable thereby to form a seal between the sealing surfaces when the surfaces contact each other, oil pressure sensing means coupled to said lower oil chamber portion and adapted to be coupled to the press machine drive means driving the coupling rod for stopping the driving of the coupling rod, said upper oil chamber portion having an opening communicating with a space at atmospheric pressure, oil supply means for supplying oil under high pressure to said lower oil chamber portion, an oil supply line coupled between said oil supply means and said oil chamber, a control device provided in the bottom wall of said slidable member defining the bottom of said lower oil chamber for returning said safety device to an operative condition after said abutment member is separated from said seal member, said control device comprising a valve oil chamber with its axis arranged vertically, a piston slidably fitted in said valve oil chamber and abuttable with said abutment member for raising said abutment member, said bottom wall having an oil passage leading from the oil supply line to said lower oil chamber section and in communication with said valve oil chamber, a relief valve provided in said oil passage, said relief valve closing the oil passage leading to said lower oil chamber section until a predetermined oil pressure develops in both said valve oil chamber and said lower oil chamber section.

References Cited
UNITED STATES PATENTS

| | | | |
|---|---|---|---|
| 1,923,127 | 8/1933 | Veenschoten | 137—505.11 |
| 1,946,188 | 2/1934 | Birch | 137—505.11 |
| 2,767,818 | 10/1956 | Huling | 192—150 |
| 2,937,733 | 5/1960 | Danly | 192—150 |
| 3,093,716 | 6/1963 | Horowitz | 137—557 |
| 3,329,250 | 7/1967 | Horst-Egon Wach | 192—150 |

JULIUS E. WEST, *Primary Examiner.*

ALLEN D. HERRMAN, *Assistant Examiner.*

U.S. Cl. X.R.

100—53; 192—56